United States Patent
Morgavi

(10) Patent No.: US 6,827,264 B2
(45) Date of Patent: Dec. 7, 2004

(54) CONCURRENT ELECTRICAL CUSTOMIZATION AND GRAPHIC PRINTING OF A SMART CARD

(75) Inventor: Paul Morgavi, La Ciotat (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 10/416,189

(22) PCT Filed: Nov. 6, 2001

(86) PCT No.: PCT/FR01/03418
§ 371 (c)(1),
(2), (4) Date: May 9, 2003

(87) PCT Pub. No.: WO02/39375
PCT Pub. Date: May 16, 2002

(65) Prior Publication Data
US 2004/0011865 A1 Jan. 22, 2004

(30) Foreign Application Priority Data
Nov. 13, 2000 (FR) .......................................... 00 14560

(51) Int. Cl.⁷ ................................................ G06K 7/08
(52) U.S. Cl. ...................... 235/451; 235/380; 235/475; 235/479; 235/492
(58) Field of Search ................................ 235/380–381, 235/451, 475, 479, 492–493

(56) References Cited

U.S. PATENT DOCUMENTS

| | | | |
|---|---|---|---|
| 5,198,652 A | | 3/1993 | Rose |
| 5,426,283 A | | 6/1995 | Berthozat et al. |
| 5,941,522 A | * | 8/1999 | Hagstrom et al. .......... 271/225 |
| 6,173,901 B1 | * | 1/2001 | McCannel .................. 235/493 |
| 6,283,368 B1 | * | 9/2001 | Ormerod et al. ............ 235/380 |
| 6,508,399 B2 | * | 1/2003 | Sasaki et al. ............... 235/381 |

FOREIGN PATENT DOCUMENTS

| | | |
|---|---|---|
| DE | 19641892 A1 | 4/1998 |
| EP | 0513885 A1 | 11/1992 |

* cited by examiner

Primary Examiner—Michael G. Lee
Assistant Examiner—Seung H Lee
(74) Attorney, Agent, or Firm—Burns, Doane, Swecker & Mathis, L.L.P.

(57) ABSTRACT

The personalisation of intelligent portable objects such as smart cards is performed on a device having a support with, on one of its faces, locations intended to receive the objects (1) to be personalised. Remote from this face, equipment for electrical personalisation (40) of the objects is disposed. A graphical printing station is provided to operate upon objects located on the support, which is moved with respect to the graphical printing station (5). The electrical personalisation and the graphical printing take place at lest in part simultaneously.

14 Claims, 3 Drawing Sheets

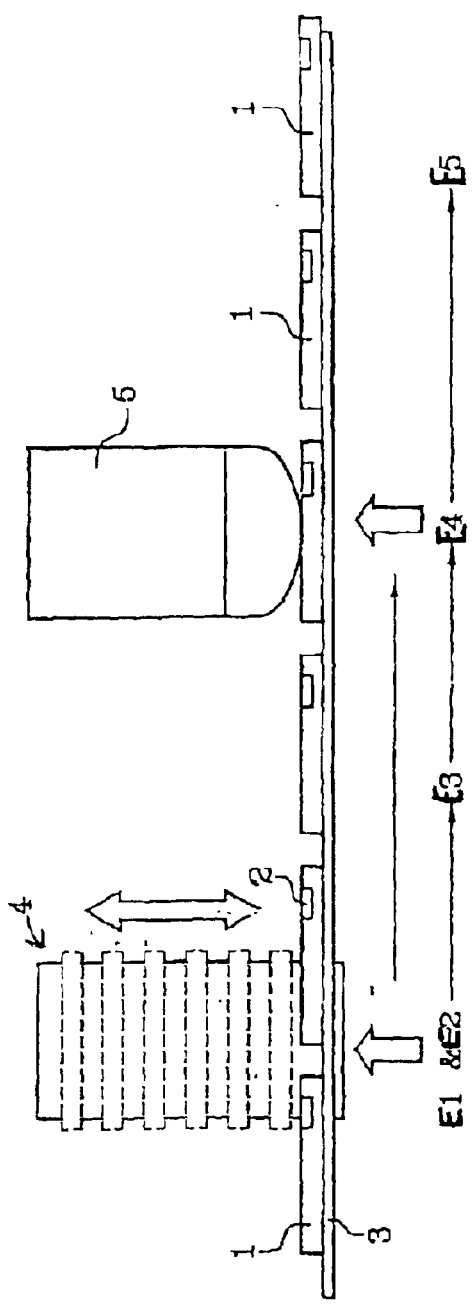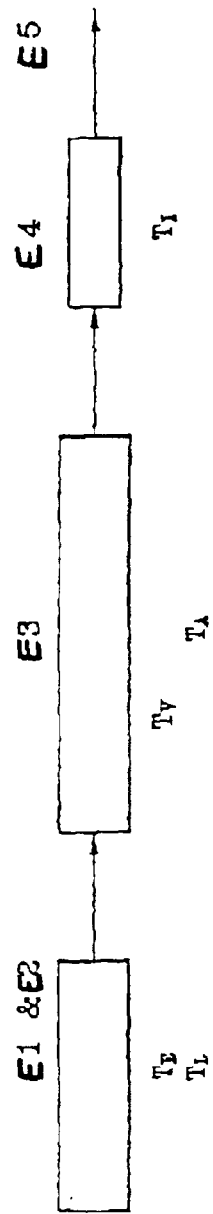

CONCURRENT ELECTRICAL CUSTOMIZATION AND GRAPHIC PRINTING OF A SMART CARD

This disclosure is based upon French Application No. 00/14560, filed on Nov. 13, 2000 and International Application No. PCT/FR01/03418, filed Nov. 6, 2001, the contents of which are incorporated herein by reference.

The field of the invention is that of the manufacture of intelligent portable objects such as smart cards, and more especially that of their personalisation.

Mention should be made in this field of the document EP-A-0513885. It proposes the quasi-simultaneous electrical reading and/or writing of information: it therefore concerns electrical personalisation. Magnetic and printed recordings are made on a mobile assembly, by movements across the width of the card.

The Gemplus document U.S. Pat. No. 5,426,283 describes a graphical personalisation which is performed either before or after the electrical personalisation.

The document U.S. Pat. No. 5,198,652 describes the taking of a photograph with instantaneous development, the transfer of this photograph onto a card body and, with another apparatus, the programming of a circuit with information.

Mention should also be made of the Gemplus document FR-A-2790421 which describes equipment on which it is possible to apply the invention.

And the document DE-A-19641892 describes a programming installation with a revolving tray where a number of cards are programmed independently.

Normally, in the example of a smart card, the main steps of this manufacture are:

production on the one hand of a body of the object, here a plastic card body;
production on the other hand of an electronic circuit (memory and/or microprocessor);
insertion, that is to say assembly of the body and the circuit;
initialisation by writing, into the circuit, data specific to the application of this object; and then
personalisation by means of which the object is adapted to its bearer and which is performed on the one hand in the form of electrical writing and on the other hand in the form of graphical or embossed ornamentation.

Personalisation is therefore carried out successively first by electrical writing, and then the graphical personalisation is performed. This is because data coming from the electrical personalisation are often used to obtain, by interrogating a database for example, the graphical data corresponding to the object to be manufactured. The different steps of the electrical and graphical personalisation are depicted in FIG. 1. And the different elements making it possible to carry out these steps are depicted in FIG. 2. These figures are described in detail later.

It should be understood that the personalisation is carried out sequentially by two mechanical systems which can possibly be either two separate items of equipment (one per system), or one item of equipment uniting the two systems, each system having a reject bin for the cards having defects. Smart cards personalised electrically but not graphically are generally blank or printed with a generic pattern for all cards; they cannot be differentiated from one another, in particular by the operator responsible for the electrical and graphical personalisation. This results in a considerable risk of error or fraud when graphical personalisation is not carried out on a good card already electrically personalised.

This risk increases when the two items of personalisation equipment are in separate locations, the transfer from one item of equipment to the other then generally being provided manually by an operator.

Furthermore, the electrical personalisation equipment and the graphical personalisation equipment each have their own rate, indicated opposite the steps of FIG. 3. Overall, the rate of the electrical and graphical personalisation method is set by the greater rate.

The electrical personalisation time varies in particular as a function of the chip type and the application. As a guide, the average electrical personalisation time for a GSM mobile telephone chip is for example approximately 12 seconds. It is then necessary, in order to keep to a customary rate of 3600 cards per hour, that is one card per second, to increase the number of electrical personalisation heads: twelve (12) in the case of GSM smart cards.

SUMMARY OF THE INVENTION

In view of the above, it should be understood that one aim of the invention is to carry out the electrical and graphical personalisations in masked time, on a single item of equipment.

To that end, the objects of the invention are a method and an item of equipment for personalisation in which at least a part of each of the electrical personalization and the graphical personalization are performed simultaneously.

Electrical and graphical personalisation in the same location guarantees security of correlation of the electrical and graphical information and avoids frauds insofar as any attempt at card retrieval between the two operations does not allow the set of two operations to be completed.

The result of the simultaneity of the graphical and electrical personalisation is a gain in productivity: instead of the electrical personalisation time being added to the graphical personalisation time, the shorter time, whichever that is, is masked by the longer time. Personalisation in masked time is sometimes spoken of.

The invention also has the advantage of reducing the number of items of equipment used and the space occupied by them, since the two items of equipment for electrical personalisation and graphical personalisation are replaced by a single item of equipment.

BRIEF DESCRIPTION OF THE DRAWINGS

Other particular features of the invention will emerge in the description of examples corresponding to the accompanying drawings.

FIG. 2 depicts schematically the different elements making it possible to carry out these steps;

FIG. 3 shows, in picture form, the times for the different electrical and graphical personalisation steps;

DETAILED DESCRIPTION

Figure 1:
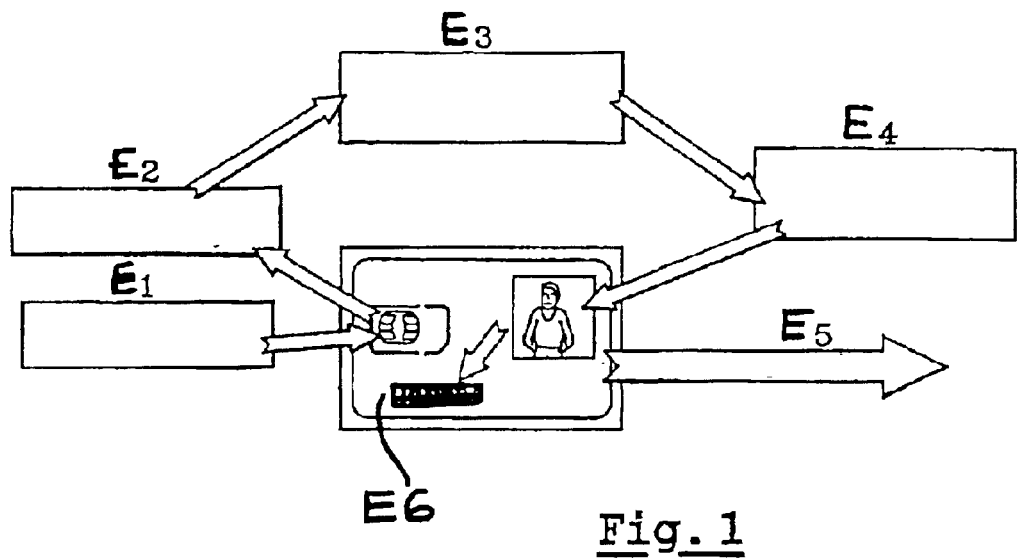
FIG. 1 illustrates the electrical and graphical personalisation steps.

Before describing a first embodiment of an item of equipment according to the invention (FIG. 4a), the different steps of the electrical and graphical personalisation depicted in FIG. 1 will be considered again:

the electrical personalisation makes provision for writing data into the chip (step E1: writing data into the chip), reading them (step E2: reading data coming from the chip) and verifying them (step E3: data verification and association of graphical data);

during verification of the electrical personalisation data, the first step of the graphical personalisation starts. From an identifier for example, supplied at the end of step 2, a processing unit retrieves, from a database, the graphical data intended to be printed on the card and then associates them with one another; these graphical data for example consist of text such as the surname and first name of the bearer of the card (designated E6 in FIG. 1), a bar code, a serial number, a photograph and/or drawings, etc. (step 3);

the graphical personalisation next consists of receiving all the graphical data and printing them on the body of the smart card (step E4: receiving graphical data and printing);

the smart card is then ready to be used according to its application (step E5: application).

The different elements belonging to personalisation equipment making it possible to carry out the steps E1, E2, E3, E4 and E5 are depicted in FIG. 2.

The cards 1 having a chip 2 are placed on a support 3. This support 3 moves so as to present the chips 2 to a single or multiple electrical personalisation station 4 in order to carry out the steps E1 and E2.

The electrical personalisation station 4 depicted in FIG. 2 is a multiple personalisation station enabling the rate to be increased. It has a lift which collects together a number of smart cards 1, for example 10 cards, and then distributes them in front of as many personalisation heads before transferring them for the following step.

The data read are submitted to the processing unit responsible for the step E3, and then the bodies of the cards 1 are presented to a graphical personalisation station 5 in order to carry out the step E4.

Here, the personalisation is sequential with two mechanical systems which can possibly be either two items of equipment (one per system), or one item of equipment uniting the two systems, each system having a reject bin for the cards having defects. Smart cards personalised electrically but not graphically are generally blank or printed with a generic pattern for all cards; they cannot be differentiated from one another, in particular by the operator responsible for the electrical and graphical personalisation. This results in a considerable risk of error or fraud when graphical personalisation is not carried out on a good card already electrically personalised.

This risk increases when the two items of personalisation equipment are in separate locations, the transfer from one item of equipment to the other then generally being provided manually by an operator.

Furthermore, the electrical personalisation equipment and the graphical personalisation equipment each have their own rate, indicated in FIG. 3.

At the data write/data read steps E1 and E2, the following times can be seen here:

250 msec<Te<40 sec: data write time;
100 msec<Tl<5 sec: data read time.

At the step E3 for data verification and association of data or graphical "data", the following times can be seen:

Tv<250 msec: data verification time;
100 msec<Ta<1 sec: graphical data association time.

At the print step E4, the print time Ti can be seen, such that 1 sec<Ti<15 sec.

Overall, the rate of the electrical and graphical personalisation method is set by the greater rate.

The electrical personalisation time varies in particular as a function of the chip type and the application as described above.

Figure 4A:
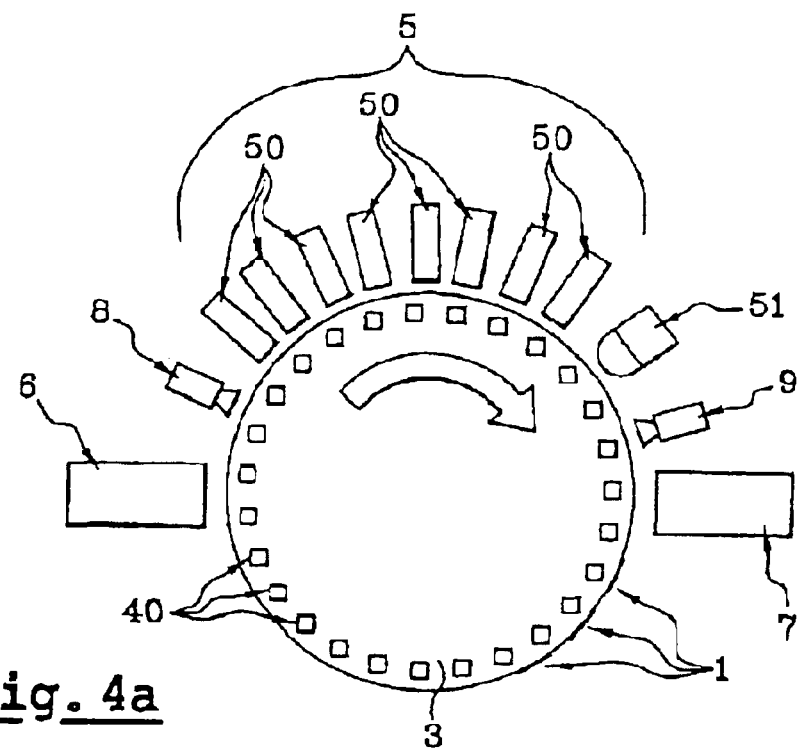
FIGS. 4a) and 4b) illustrate a first embodiment of an item of equipment according to the invention.

In FIG. 4a, a support 3 for the smart cards 1 to be personalised appears in the form of a wheel or drum capable of revolving and having locations intended to receive the cards 1, for example 36 smart cards.

Figure 4B:
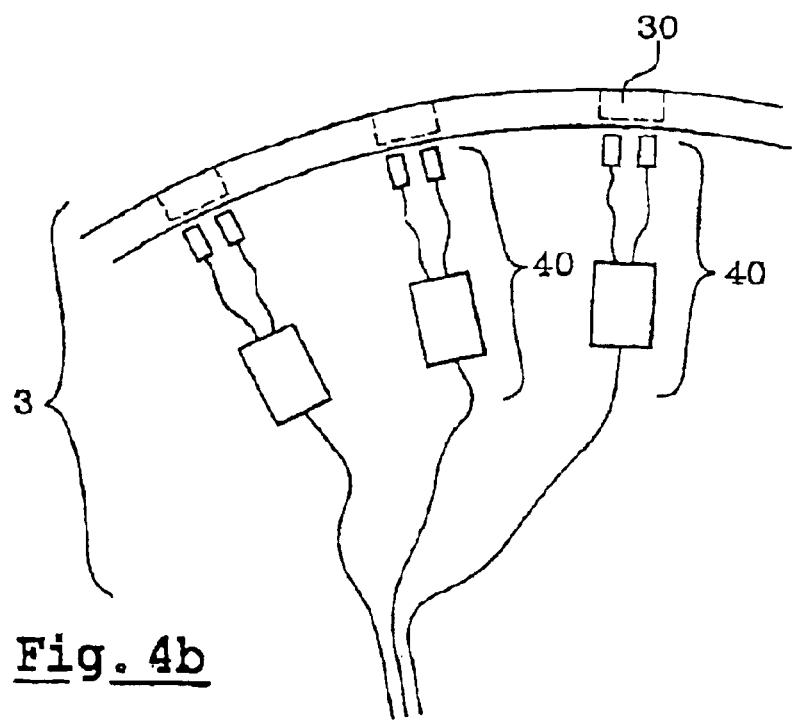

The electrical personalisation station has electrical personalisation heads 40 distributed and fixed inside the drum 3, opposite each chip location of the cards 1. As depicted in FIG. 4b), these chip locations are delimited by markers 30 possibly appearing in the form of cavities, made on the drum 3.

Reference is made to FIG. 4a). The fixed graphical printing station consists of one or more print heads 50 depending on whether it is wished to obtain monochrome or colour printing. The graphical print heads 50 are preferably situated on the other side of the smart card 1 compared to the electrical personalisation heads 40.

Graphical print heads with 256 ink jets per head can be used. The inks will then be dried by an ink drying device 51, for example an ultraviolet lamp. Other printing devices can be used, in particular thermal printing devices.

This equipment of course comprises devices for input 6 and output 7 of the smart cards 1. It also has a system for dimensional checking 8 of the smart cards 1 to be personalised, consisting for example of a camera, and a system for graphical checking 9 of the printed smart cards which can also consist of a camera.

The device for input 6 of the smart cards 1 places the cards 1 on the drum 3. On revolving, the drum 1 presents the smart cards 1 to the system for dimensional checking 8 of the cards, to the print heads 50, to the drying device 51 and possibly then to the graphical checking system 9.

During rotation of the drum 3, the smart cards 1 are in contact or in communication with the electrical personalisation heads 40. Thus, while the graphical image is forming on the surface of the smart card 1, the electrical personalisation heads 40 write or read data inside the chip.

In the case of cards with contacts, the chip is exposed on the surface of the card. The electrical personalisation heads 40 then have electrical contacts by means of which the information inside the chip is written and/or read. Insofar as the graphical print heads 50 are situated on the other side of the card compared to the electrical personalisation heads 40, the graphical information is printed on the face of the card opposite the electrical contacts of the card.

In the case of contactless cards, the contacts of the chip consist of an antenna buried in the body of the card. The electrical personalisation heads 40 then have antennas by means of which the information inside the chip is written and/or read.

In the case of mixed cards with ohmic contacts and contact by antenna, referred to as "combicards", the chip has both exposed contacts and an antenna. The electrical personalisation heads 40 then have antennas and/or electrical contacts.

The electrical and graphical personalisation can be obtained in a single pass of the smart cards under the printing station or in a number of passes. The rotation of the drum makes it possible to carry out a number of passes, for example 6. This rotation takes place preferably in one direction but it can take place in one and/or the other direction.

Figure 5:
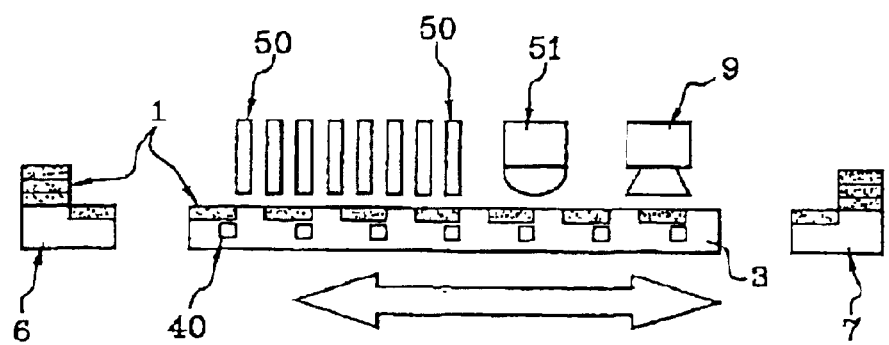
FIG. 5 illustrates a second embodiment of an item of equipment according to the invention.

A second embodiment of an item of equipment according to the invention is shown in FIG. 5. The same functional elements as for FIG. 4a) are found, but this time the support 3 is flat.

Here again, the graphical personalisation may require one or more passes.

The printing station comprising the print heads 50 can be fixed as in the previous embodiment. The support 3 can then be driven with a constant and single translational motion or to-and-fro motion depending on whether single-pass or multi-pass graphical printing of the smart card 1 is concerned. Print times of 4 to 6 seconds can be achieved.

The printing station can, on the contrary, be mobile: it is then the print heads 50 which perform the passes over the smart cards 1, the support 3 being fixed. As in the previous case, the printing station can be driven with a constant and single translational motion or to-and-fro motion depending on whether single-pass or multi-pass graphical printing of the smart card is concerned. The performance obtained is often inferior to that of the previous case.

According to the two embodiments presented, the electrical and graphical personalisation operations are carried out automatically without the smart cards being handled by an operator and thus ensure the consistency of the electrical and graphical information.

This results in increased security and a reduction in the possibilities of fraud.

Management of electrical or graphical rejects is also improved. This is because, if one of the systems for video checking (systems 8 or 9 in FIG. 4*a*)) or for verifying the electrical data (step E3 in FIGS. 1 and 3) detects that a card 1 does not conform, the smart card 1 can then have its graphical printing modified in order to indicate clearly that the smart card 1 does not conform: text such as "reject" or "scrap" can for example be added. The content of the electrically written information can also be blocked or erased so that use of the smart card is no longer possible.

What is claimed is:

1. Equipment for personalizing intelligent portable objects, which comprises:
   a support having one face with locations to receive the objects to be personalized and means on another face for electrical personalization of the objects;
   a station for graphical printing of the objects, and
   means for moving the objects linked to the support to present the objects to be personalized at least in part simultaneously to the printing station and to the electrical personalization means, so that said station and said personalization means act at least in part simultaneously on an object to be personalized.

2. Equipment according to claim 1, wherein the support is fixed and the graphical printing station is mobile.

3. Equipment according to claim 1, wherein the support is mobile and the graphical printing station is fixed.

4. Equipment according to claim 1 wherein the support is a drum, having an axis of rotation that is substantially horizontal.

5. Equipment according to claim 1 wherein the means for electrical personalization of the cards have electrical contacts corresponding to locations of chips in objects to be personalized on the support.

6. Equipment according to claim 1 wherein the means for electrical personalization of the objects have antennas situated opposite the locations of chips in objects on the support, and facing the graphical printing station.

7. Equipment according to claim 1 further including a device for graphical and/or electrical checking of the objects to be personalized.

8. A method for personalizing intelligent portable objects, which comprises moving an object to be personalized on a support which presents the object to be personalized at least in part simultaneously to a graphical printing station and to an electrical personalization means, so that said station and said electrical personalization means act at least in part simultaneously on an object to be personalized.

9. A method according to claim 8, wherein the electrical personalization is carried out entirely during the graphical printing.

10. Equipment for personalizing intelligent portable objects, comprising:
    a graphical printing station;
    a support having locations at which objects to be personalized are received, for presenting one face of objects received at said locations to said graphical printing station; and
    electrical personalization heads associated with said locations on said support so as to be juxtaposed with an opposite face of objects received at said locations to simultaneously electrically personalize an object while printing of said one face of said object takes place at said printing station.

11. The equipment of claim 10, wherein said support comprises a drum having a substantially horizontal axis of rotation.

12. The equipment of claim 10, wherein said personalization heads are in electrical contact with objects received at said locations.

13. The equipment of claim 10, wherein said personalization heads include antennas for contactless communication with objects received at said locations.

14. The equipment of claim 10, further including a device for checking the graphical printing on the objects.

* * * * *